March 20, 1928.  
L. F. GOTTWALD  
1,663,046  
ADJUSTABLE PARTITION FOR DOUGH TROUGHS  
Filed Nov. 24, 1925
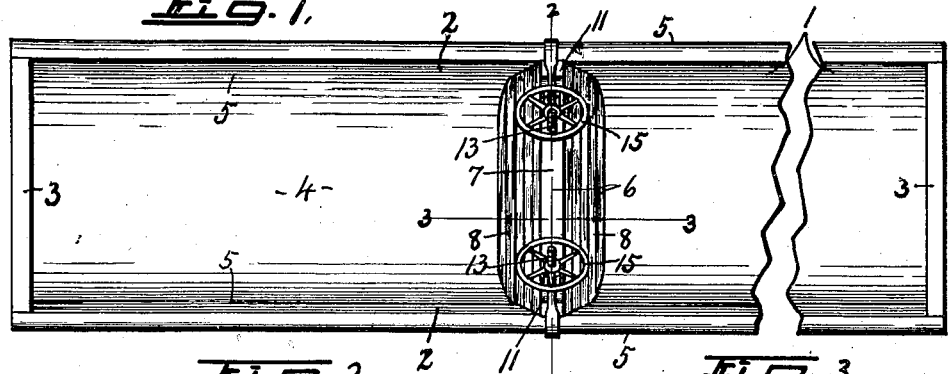
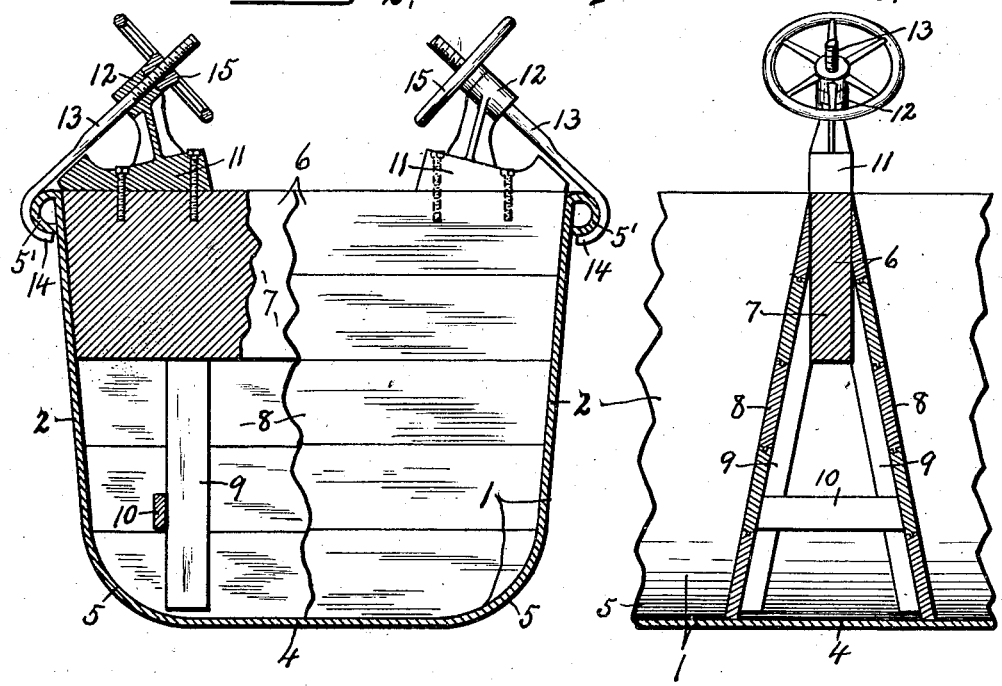

Patented Mar. 20, 1928.

1,663,046

UNITED STATES PATENT OFFICE.

LOUIS F. GOTTWALD, OF SYRACUSE, NEW YORK.

ADJUSTABLE PARTITION FOR DOUGH TROUGHS.

Application filed November 24, 1925. Serial No. 71,134.

This invention relates to a dough trough as commonly used by bakers and refers more particularly to a partition adjustable lengthwise of and within the trough for dividing the latter into separate compartments in which batches of dough of the same or different characteristics may be prepared for baking.

The main object is to provide a partition adapted to closely conform to the cross sectional form and size of the interior of the trough so as to closely conform and at the same time is capable of adjustment to different positions throughout the length of the trough for dividing the latter into compartments of equal or unequal capacities as may be required for different batches of dough.

Another object is to provide the partition with means whereby it may be firmly clamped to the side walls of the vat in any position of adjustment.

Another object is to position the clamps in such manner that when tightened they will effect a downward pressure upon the partition and will also exert a downward pressure upon the side walls of the vat thereby assuring a tight joint between the lower and side edges of the partition and adjacent walls of the vat.

Other objects and uses relating to specific parts of the device will be brought out in the following description.

In the drawings:

Figure 1 is a top plan of a portion of a trough and one of my improved partitions operatively mounted therein, a portion of the trough being broken away.

Figure 2 is an enlarged transverse vertical sectional view taken on line 2—2, Figure 1.

Figure 3 is an enlarged longitudinal sectional view of a portion of a trough and partition taken on line 3—3, Figure 1.

In order that the invention may be clearly understood I have shown a portion of a dough trough —1— which may be of standard construction having the usual side walls —2— and end walls —3— and a bottom wall —4— united to the side walls by curved corners —5—, the upper edges of the side walls being returned outwardly and downwardly to form lengthwise flanges or shoulders —5—.

The side walls —2— are preferably disposed in upwardly diverging planes to facilitate the placing, manipulation and removal of the dough and also to facilitate the insertion, removal and adjustment of the partition as —6—, presently described.

The trough —2— is preferably made of sheet metal but obviously can be made of any other material without departing from the spirit of the present invention.

The partition —6— is preferably A-shaped longitudinally of the vat and extends from side to side and from top to bottom thereof so that its bottom and side edges closely fit against the corresponding bottom and side walls of the vat when it is installed for use.

As illustrated, the partition comprises a transversely extending ridge bar —7— and opposite downwardly diverging end walls —8— which are reenforced, or stiffened, by cleats —9— and braces —10—, Figure 3, the upper edges of the side walls —8— and cleats —9— being secured to opposite faces of the ridge bar —7— to form equal angles with the ridge bar.

The parts of the partition thus far described are preferably made of maple, or other suitable hard wood, but obviously may be made of other materials if desired.

A pair of brackets —11— are bolted or otherwise secured to the upper edge of the ridge bar —7— near the side edges thereof and in spaced relation to each other, the inner ends of said brackets being extended upwardly some distance above the upper edge of the partition and are provided with downwardly and outwardly inclined guides or bolt openings —12— for receiving a pair of clamping bolts —13— which also incline downwardly and outwardly from the guides —12— and are provided at their outer ends with hook-shaped portions —14— for engaging the flanges —5— on the upper edges of opposite sides of the vat.

The upper inner ends of the clamping bolts —13— are threaded and extend some distance beyond their respective guides —12— for engagement by hand operated nuts —15— which, in turn, are engaged with the upper inner end faces of the guides —12— whereby the tightening of the nuts will draw the hook-shaped extremities —14— firmly against the lower and outer faces of the flanges —5—.

This angular disposition of the clamping bolts —13— in downwardly diverging planes is an important feature of the invention for the reason that when the partition is placed in operative position within the vat with the hook-shaped extremities —14— of the clamping bolts —13— engaged with the lower and outer faces of the flanges —5—, the tightening of the hand nuts —15— will operate to force the partition downwardly, firmly against the bottom and sides of the vat or troughs, and at the same time will cause the hook-shaped extremities —14— to draw the side walls of the vat firmly against the adjacent edges of the partition thereby assuring a tight joint between the opposite side and bottom edges of the partition and corresponding bottom and sides of the vat to prevent the passage of any part of the dough of one batch in one compartment into the next adjacent compartment and also assuring a firm anchorage of the partition in its adjusted position.

When it is desired to shift the partition along the dough troughs it is simply necessary to loosen the hand nuts —15— which, by reason of the vertical taper of the side edges and side walls of the vat, enables the partition to be quickly loosened and shifted to any desired position lengthwise of the vat whereupon the hand nuts may be re-tightened for locking the partition in its adjusted position.

What I claim is:

1. An adjustable partition for dough troughs having spaced brackets on its upper edge, and separate screw clamps on the brackets provided with means for engaging the upper portions of opposite edges of a trough.

2. An adjustable partition for dough troughs having separate screw clamps near opposite sides of its upper edge for clamping it to a dough trough.

3. An adjustable partition for dough troughs comprising a ridge beam and downwardly diverging side walls secured to the beam to face in the direction of length of the troughs, brackets secured to the upper edge of the beam in spaced relation, and separate clamping devices on the brackets for clamping the partition to the upper marginal edges of the troughs.

4. An adjustable partition for dough troughs having brackets secured to the upper edge thereof and provided with downwardly diverging guides and clamping bolts adjustable in said guides and provided with means for engaging opposite sides of the trough for clamping the partition in its adjusted position.

5. A partition for dough troughs comprising a ridge bar and opposite downwardly diverging sides facing in the direction of length of the troughs, said partition being of substantially the same cross sectional area and form as the interior of the troughs, brackets secured to and rising from the upper edge of the partition near the side edges thereof and provided with upwardly converging guides and bolts movable endwise in said guides and having their outer ends hook-shaped for engaging the upper edges of opposite sides of the trough, and nuts engaging the other ends of the bolts for tightening and loosening the same.

In witness whereof I have hereunto set my hand this 11th day of November, 1925.

LOUIS F. GOTTWALD.